Beers & Winslow,
Planing and Matching Machine.

N° 7,949.  Patented Feb. 25, 1851.

UNITED STATES PATENT OFFICE.

JNO. D. BEERS AND ISAAC WINSLOW, OF PHILADELPHIA, PENNSYLVANIA.

PLANING-MACHINE.

Specification of Letters Patent No. 7,949, dated February 25, 1851.

*To all whom it may concern:*

Be it known that we, JOHN D. BEERS and ISAAC WINSLOW, both of the city and county of Philadelphia and State of Pennsylvania, have invented an Improved Planing-Machine, and do hereby declare the following to be a full and exact description thereof, reference being had to the accompanying drawings, making part of this specification.

Figure 1:
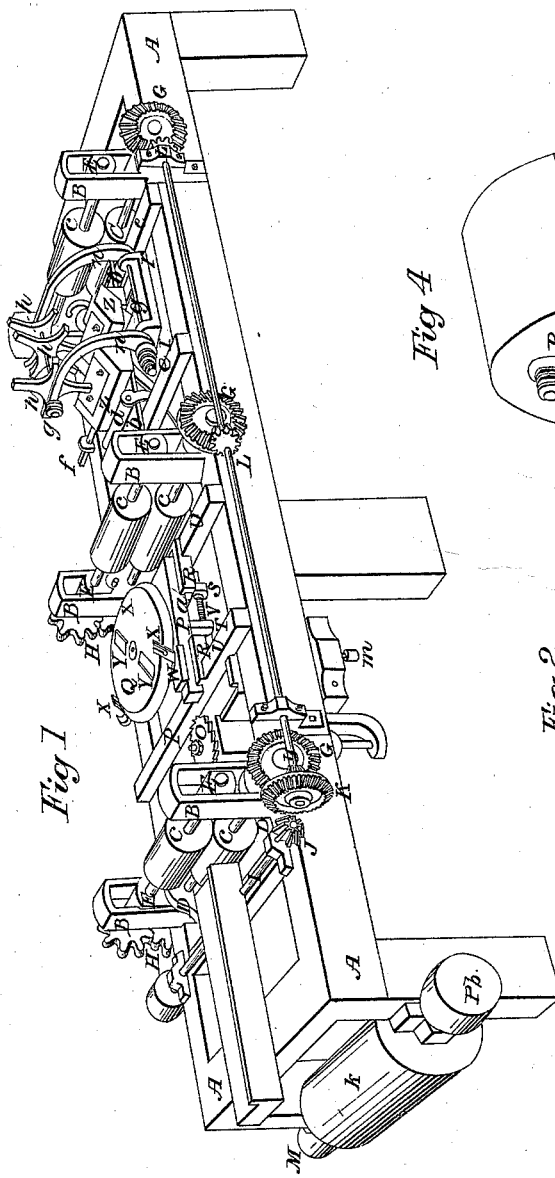

The frame A, A, Figure 1 is of the usual form and dimensions, on the inside of which are bolted six housings B, containing the boxes for the journals of the rolls C to run in. The upper rolls with their journals moving vertically in their housings to admit between them boards of different thickness, the boxes E having attached to them the hangers D which being connected with weighted levers inside the frame serve to keep the rolls closely pressed upon the board to pass it through the machine, on the journals of the under rolls are fastened the bevel wheels G and on the opposite side of the machine on the journals of the same rolls are fastened the star wheels H which gear into similar wheels on the journals of the upper rolls, on the shaft I is the pinion J gearing into the wheel K and on its shaft are the pinions L gearing into the wheels G, this arrangement of gearing giving motion to the rolls by a belt from the pulley M to the pulley N.

The tonguing and grooving is done by circular saws on two vertical shafts, the one for making the tongue seen at O, and saws are arranged on the other shaft for making the groove being fitted and adjustable in the usual way for different widths of boards.

The guides P and P $a$ are two pieces of iron passing under the disk or planing wheel Q and firmly supported by two other pieces of iron U crossing the machine and secured thereto, one of these guides has a tongue and the other a groove on it to receive the tongue and groove formed on the board by the saws, these guides support the edges and under side of the board as it passes under the disk or planing wheel Q before named to be reduced to a uniform thickness. One of these guides P has a lateral motion to adapt it to the width of the board, which motion is given by a screw drawing it from or pushing it toward its opposite guide; the guide P $a$ has a longitudinal motion sliding in a groove in the stationary piece R R which groove being widest at the bottom and the guide fitted to it prevents the rising of said guide, there are two projections S and T formed on and underneath the pieces R and P $a$, S being cast on R R and T on P $a$ and a screw V is fitted so as to revolve in S and enter with its thread into the projection T which forms its nut and said screw being turned moves the guide P $a$ backward and forward longitudinally.

W is a piece of hard wood secured to the guide P $a$ and so adjusted as to press the upper shoulder of the tongue and the corner of the board at the point where the plane irons of Q in rotating pass off of said board and prevents the sharp corner from splitting or being splintered off by the action of the plane irons. When W becomes too much worn to perform its office a few turns of the screw V moves the guide P $a$ and brings an unworn part of W under the action of the plane irons thus renewing its support to the corner of the board without any detention and prevents loss of time.

Figure 2:
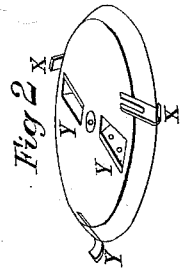

The circular disk Q is of cast iron secured to a perpendicular shaft seen at O' which revolves in two boxes one on the inside of the frame and the other on the leg of the machine, a screw $m$, at the lower end of the shaft serves to raise and lower the disk and adapt it to the thickness of the boards to be planed, the periphery of the wheel is beveled with sloping cuts on it to receive three or more gage cutters X made with a slit through which a screw passes into the disk to secure the gages firmly in their places and admit of their ready adjustment, Y are two long planing irons which pass through apertures in the disk at the usual angle for planing being secured to the disk by screws in the usual manner, the edges of these knives are in the same plane with the finished surface of the board as at right angles with the perpendicular shaft, except the corners which are slightly rounded; they are made an inch longer than the width of the widest board to be planed, these knives are made use of when no extra smoothing is required and serve to finish the board on one side for common purposes without using the stationary smoothing planes hereafter described, the disk and knives are likewise seen in Fig. 2 on a larger scale.

There are two upper and two lower stationary planes used in this machine, the latter for planing and smoothing the under side of the board and the two upper ones seen at Z Z Fig. 1 are for smoothing the upper side of the board when reduced to a uniform thickness by the rotating gages, these same planes may be suppressed if not wanted, by drawing back the irons and letting the board pass freely between the upper and lower plane stocks.

Figure 5:
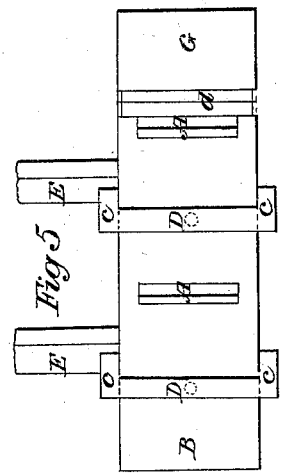
Figure 7:
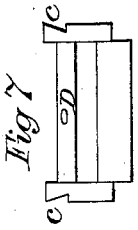
Figure 6:
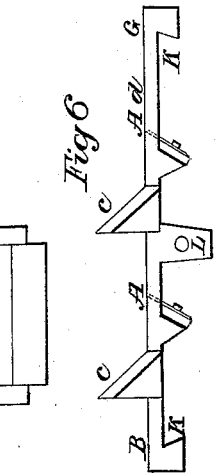

Figs. 5, 6, and 7 are different views of the lower smoothing plane stock, which serves as a bed plate to support the board and the upper smoothing planes. In the above three figures similar letters refer to similar parts of the three drawings. Figs. 5 and 6 should be turned end for end to correspond with the bed plate as seen at b b Fig. 1.

Fig. 5 is a plan or top view Fig. 6 a side elevation. Fig. 7 an end elevation of the above named bed plate and smoothing plane stock.

A Fig. 5 represents the mouths and irons of the planes the irons of which are placed at the usual angle.

G B is the stock and bed plate, C, the projections on which the upper planes slide up and down, d the roll under which the board passes seen also at d Fig. 1, E are the projections on which the breaker and blower (hereafter described) is hung, D D are holes in the cross bars into which the regulating screws of the upper smoothing planes enter.

K K Fig. 6 are dovetail or sloping flanges cast on the bed plate and fitted to the cross bars seen at e e Fig. 1, which bars serve to support the bed-plate with all the smoothing planes upon it holding and guiding them in their lateral motion given to them by turning the screw f Fig. 1 which enters the hole in the projection L Fig. 6. This motion serves to change the wearing edges of the plane irons and prevent their wearing unequally, as when tonguing and grooving are combined with planing, one edge of the board is constantly on the same line in passing through the machine, and most of the boards being narrow one part of the plane iron will be much more worn than the other, which by this combination is wholly obviated.

Figure 8:
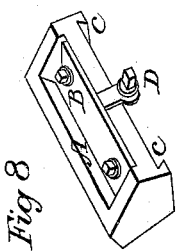

Fig. 8 is a perspective view of one of the upper smoothing planes seen at Z Z Fig. 1, D is the regulating screw which enters the hole D in the cross bar seen at Figs. 5 and 7, by turning said screw the plane is raised or lowered. C C are dovetails which slide on the projection seen at Figs. 5, 6 and 7 as before described, B B are two screws to secure the plane iron to the stock, A is the opening where the shavings pass out of the plane and meet the breaker and blower, the upper and under smoothing planes are so arranged as not to interfere with each other and are all readily seen inspected and regulated, the upper planes are used to press the boards upon the lower ones, for this purpose a strong spring may supply the place of the regulating screw seen at D Fig. 8.

The mode adopted in this machine is an improvement on the method heretofore used for stationary planes where both sides of the board are to be planed as it materially lessens the friction, making the planes themselves act and react upon the board and on each other thus avoiding the necessity of separate pressure for the upper and lower planes.

We likewise make use of a breaker and blower combined to break the upper shavings and blow and throw them with the dust and dirt from the planes to prevent dulling the knives and to place the shavings in a convenient position to be made use of for fuel, &c.

Figure 4:
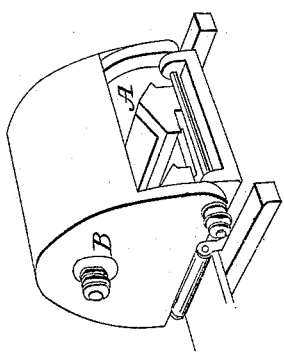

The frame of the breaker and blower is made as follows, n n Fig. 1 are two pieces of curved metal fastened to and turning up or open from the smoothing planes on the shaft g as a hinge which has its bearings at r on a piece of metal cast with or firmly secured to the bedplate before described, at the upper ends of the arms n n, are boxes on which the shaft g revolves, having secured to it three or more breakers or blowers h made of sufficient width and thickness to break and blow the shavings in any desired direction. Motion is given to the breakers by band from whirl I', to whirl I the latter revolving with shaft y the whirl I', being connected by a band with any convenient drum or pulley to give it motion, the breakers and blowers are made to revolve as near the delivery of the shaving in the throat of the plane as possible, for the purpose of description these breakers and blowers have been drawn without their cover Fig. 4, which is placed over them when operating, being fastened to the curved arms n n above described. A Fig. 4 being the opening through which the broken shavings are blown and thrown out. B is an opening to allow air to enter the blower the cover of which is fitted round the planes to prevent shavings from getting under the board, the breakers and blower with their cover may be thrown back out of the way of the operator when examining the planes &c. and returned again to their place without stopping their rotation, the pulley P b Fig. 1 receives the driving belt and communicates motion to the drum K and pulley M on the same shaft which drives the machine.

What we claim and desire Letters Patent for is—

1. The combination of the shifting bed plate with the planes Z Fig. 1 constructed in the manner herein described, the planes presenting any desired part of their edge for cutting the surface of the board after the tonguing and grooving has been performed by the circular saws.

2. We also claim the rotating arms $h$ Fig. 1 with their cover Fig. 4 combined with the plane Z Fig. 1 substantially in the manner and for the purposes herein set forth.

JOHN D. BEERS.
ISAAC WINSLOW.

Witnesses:
Jos. I. Dugan,
B. Donovan.